US006976190B1

(12) United States Patent
Goldstone

(10) Patent No.: US 6,976,190 B1
(45) Date of Patent: Dec. 13, 2005

(54) SERIAL ATA DISK DRIVE HAVING A PARALLEL ATA TEST INTERFACE AND METHOD

(75) Inventor: Marc B. Goldstone, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 611 days.

(21) Appl. No.: 10/209,804

(22) Filed: Jul. 31, 2002

(51) Int. Cl.[7] .......... G06F 11/00

(52) U.S. Cl. .......... 714/42; 714/43; 710/36; 710/71; 710/306

(58) Field of Search .......... 714/42, 43; 710/36, 710/71, 306, 38

(56) References Cited

U.S. PATENT DOCUMENTS

| | | | | |
|---|---|---|---|---|
| 5,596,724 A * | 1/1997 | Mullins et al. | ............... | 710/71 |
| 6,199,122 B1 | 3/2001 | Kobayashi | | |
| 6,854,045 B2 * | 2/2005 | Ooi et al. | ............... | 711/202 |
| 2002/0147945 A1 * | 10/2002 | Fox et al. | ............... | 714/47 |
| 2003/0005188 A1 * | 1/2003 | Tehrani et al. | ............... | 710/15 |
| 2003/0191874 A1 * | 10/2003 | Drescher et al. | ............... | 710/38 |
| 2004/0068685 A1 * | 4/2004 | Yuan et al. | ............... | 714/741 |

* cited by examiner

*Primary Examiner*—Robert Beausoliel
*Assistant Examiner*—Christopher McCarthy
(74) *Attorney, Agent, or Firm*—Robroy R. Fawcett, Esq.

(57) ABSTRACT

A serial ATA disk drive having a parallel ATA test interface is disclosed. A bridge circuit has a serial ATA port that is coupled to a serial ATA interface for receiving and transmitting serial ATA data signals, a parallel ATA port for receiving and transmitting parallel ATA signals, and a disable input for selectably disabling the parallel ATA port. The bridge circuit performs signal conversions between the ports. The test interface is for coupling the disk drive to a disk-drive test system. The test interface includes a connector having contacts for parallel ATA signals, and having a contact for a disable signal coupled to the disable input. The connector may be a pad pattern on a printed circuit of the disk drive. The disk drive may have an industry standard form factor, and the connector may be configured such that it lies within the disk drive's form factor.

7 Claims, 3 Drawing Sheets

SERIAL ATA DISK DRIVE HAVING A PARALLEL ATA TEST INTERFACE AND METHOD

BACKGROUND OF THE INVENTION

1. Field of the Invention

The present invention relates to a disk-drive test interface, and more particularly, to a serial ATA disk drive having a parallel ATA test interface.

2. Description of the Prior Art

A standard parallel ATA interface uses a 40 pin connector and a bulky flat ribbon cable that is becoming unable to accommodate further growth in the data transfer capacity of the interface. A serial ATA interface is emerging that can accommodate growth in data transfer capacity and that uses a significantly smaller 7 conductor connector. The connector includes a receive differential pair of conductors and a transmit differential pair of conductors. The remaining three conductors are ground connections. The serial ATA interface does not provide for nonstandard (or vendor specific) disk-drive commands. Typically, nonstandard disk-drive commands are used primarily during disk-drive manufacture and quality testing.

Accordingly, there exists a need for a serial ATA disk drive that supports nonstandard disk-drive commands. The present invention satisfies theses needs.

SUMMARY OF THE INVENTION

The present invention may be embodied in a disk drive having a serial ATA interface, a bridge circuit, and a test interface. The serial ATA interface is for coupling the disk drive to a host computer. The bridge circuit has a serial ATA port that is coupled to the serial ATA interface for receiving and transmitting serial ATA data signals, a parallel ATA port for receiving and transmitting parallel ATA signals, and a disable input for selectably disabling the parallel ATA port of the bridge circuit. The bridge circuit performs signal conversion between the ports. The test interface is for coupling the disk drive to a disk-drive test system. The test interface includes a connector having contacts for parallel ATA signals, and having a contact for a disable signal coupled to the disable input of the bridge circuit.

In more detailed features of the invention, the connector may be a pad pattern on a printed circuit board of the disk drive, or it may be an edge connector for mating with a female card edge connector. The connector may have contacts for providing electrical power to the disk drive. Also, the disk drive may have a sequencing input, and the connector may have a contact for a signal coupled to the sequencing input of the disk drive. Finally, the disk drive may have an industry standard form factor, and the connector may be configured in the disk drive such that it lies within the industry standard form factor.

In another embodiment of the invention may reside in a method for testing a serial ATA disk drive. In the method, a signal is applied to the disable signal contact of the connector to disable the parallel ATA port of the bridge circuit. After the parallel ATA port is disabled, parallel ATA signals are applied to the contacts of the test interface for testing the disk drive.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
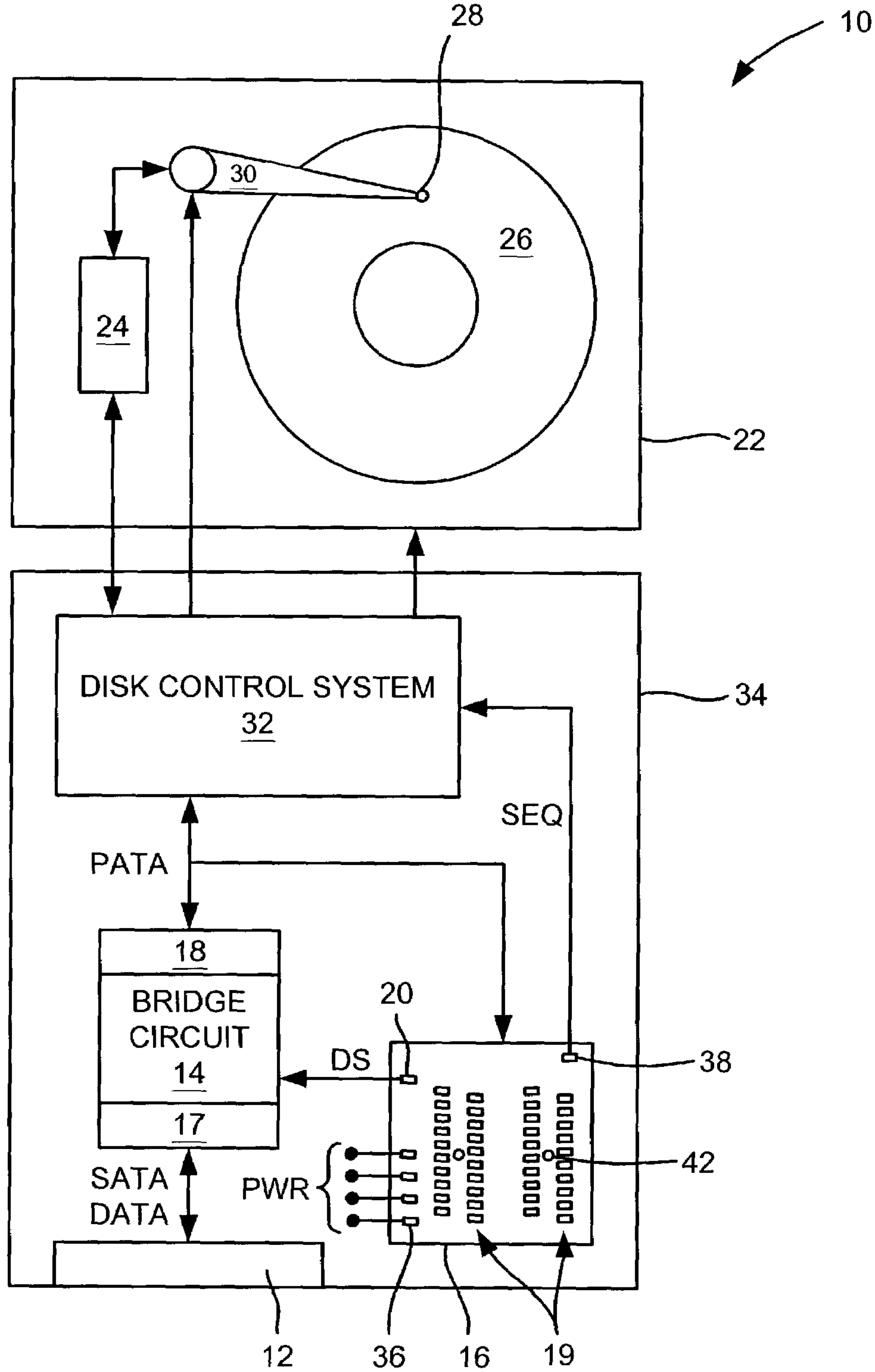
FIG. 1 is a schematic diagram of a first embodiment of a serial ATA disk drive that includes a test interface with a connector having a pattern of contact pads for coupling parallel ATA signals, according to the present invention.

With reference to FIG. 1, the present invention may be embodied in disk drive 10 having a serial ATA interface 12, a bridge circuit 14, and a test interface 16. The serial ATA interface 12 is for coupling the disk drive to a host computer (not shown). The bridge circuit 14 has a serial ATA port 17 that is coupled to the serial ATA interface 12 for receiving and transmitting serial ATA data signals (SATA DATA), a parallel ATA port 18 for receiving and transmitting parallel ATA signals (PATA), and a disable input DS for selectably disabling the parallel ATA port of the bridge circuit. The bridge circuit performs signal conversion between the ports except when the parallel ATA port is disabled. The test interface is for coupling the disk drive to a disk-drive test system (not shown). The test interface 16 includes a connector having contacts 19 for parallel ATA signals, and having a contact 20 for a disable signal coupled to the disable input DS of the bridge circuit.

The disk drive 10 also has a head-disk assembly (HDA) 22 that includes a preamplifier 24, one or more magnetic disk(s) 26 rotated by a spindle motor (not shown), and a transducer head 28 attached to a rotary actuator 30 that moves and positions the transducer head. The HDA is coupled to a disk control system 32 which includes circuitry and processors that control the HDA and that provide an intelligent interface between the host computer and the HDA for execution of disk-drive commands. The disk control system includes a parallel ATA interface that is coupled to the parallel ATA port 18 and to the test interface 16 for receiving and transmitting parallel ATA signals. The disk control system may have an internal microprocessor and nonvolatile memory for implementing programmatic control of the disk drive. Program code for implementing the disk-drive processes and control may be stored in the nonvolatile memory and transferred to volatile random access memory (RAM) for execution by the microprocessor.

The connector of the test interface 16 may be a pattern of pads or contacts, 19 and 20, on a printed circuit board 34 of the disk drive 10. The connector, the SATA interface 12, the bridge circuit 14, the disk control system 32, and other disk drive electronics may reside on the printed circuit board. Advantageously, the disk drive has an industry standard form factor, and the connector is configured in the disk drive such that it lies within the industry standard form factor. The connector also may have contacts 36 for providing electrical power PWR to the disk drive. Also, the disk drive may have a sequencing input that allows for stepping through a commanded sequence leading to spin up of the disk 26. Accordingly, the connector may have a contact 38 for a signal (SEQ) coupled to the sequencing input of the disk drive.

The disk-drive test station may be coupled to the pads or contacts, 19, 20, 36 and 38, of the connector using a compression connector (not shown) having contact pins that apply suitable contact compression force to enable reliable electrical connection to the corresponding contact or pad. The connector of the test interface 16 also may include one or more alignment holes 42 for receiving alignment member(s) on the compression force connector.

Figure 2:
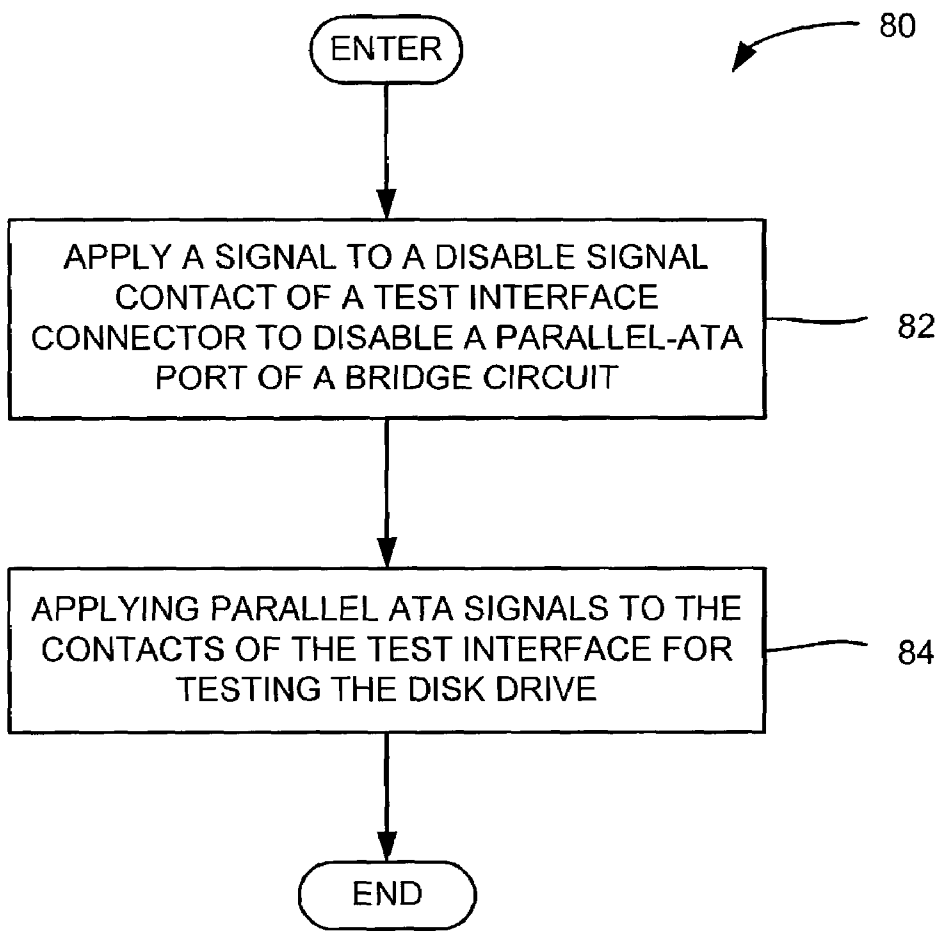
FIG. 2 is a flow chart illustrating another embodiment of a method for testing a serial ATA disk drive, according to the present invention.

With reference to FIG. 2, in a method 80 for testing the serial ATA disk drive 10, a signal is applied to the disable signal contact 20 to disable the parallel ATA port 18 of the bridge circuit 14 (step 82). After the parallel port is disabled, parallel ATA signals are applied to the contacts 19 of the test interface 16 for testing the disk drive (step 84). A suitable bridge circuit is available from Marvell Semiconductor, Inc., of Sunnyvale, Calif.

Once the test interface 16 is coupled to the test station, the test station may issue nonstandard disk-drive commands for manufacture and quality testing of the disk drive 10. The test interface advantageously allows for use of existing techniques and equipment developed for parallel ATA disk drives. The use of existing techniques and equipment eases economic concerns associated with the introduction of serial ATA disk drives.

Figure 3:
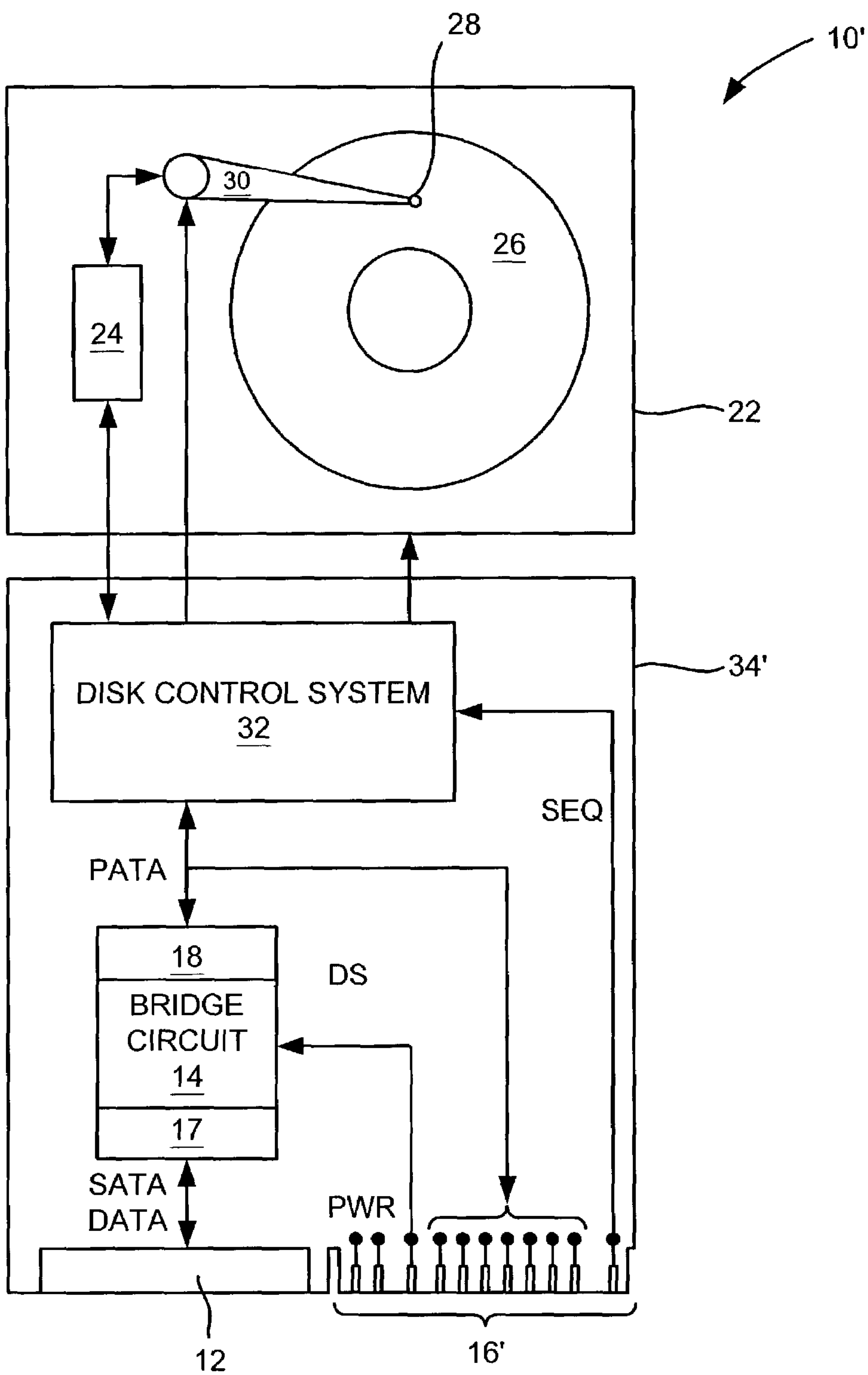
FIG. 3 is a schematic diagram of a second embodiment of a serial ATA disk drive that includes a test interface with an edge connector having a pattern of contact pads for coupling parallel ATA signals, according to the present invention.

With reference to FIG. 3, another embodiment of the invention may reside in a disk drive 10' having a test interface 16' comprising an edge connector formed along an edge of the printed circuit board 34'. The edge connector is for mating with a female card edge connector (not shown) of the test station.

I claim:

1. A disk drive, comprising;

a serial ATA interface for coupling the disk drive to a host computer;

a bridge circuit having a serial ATA port coupled to the serial ATA interface for receiving and transmitting serial ATA data signals, a parallel ATA port for receiving and transmitting parallel ATA signals, and a disable input for selectably disabling the parallel ATA port, the bridge circuit performing signal conversions between the ports; and a test interface for coupling the disk drive to a disk-drive test system, the test interface including a connector having contacts for parallel ATA signals and having a contact for a disable signal coupled to the disable input of the bridge circuit.

2. A disk drive as defined in claim 1, wherein the connector is a pad pattern on a printed circuit of the disk drive.

3. A disk drive as defined in claim 1, wherein the connector is an edge connector for mating with a single female card edge connector.

4. A disk drive as defined in claim 1, wherein the connector has contacts for providing electrical power to the disk drive.

5. A disk drive as defined in claim 4, wherein the disk drive has a sequencing input and the connector has a contact for a signal coupled to the sequencing input of the disk drive.

6. A disk drive as defined in claim 4, wherein the disk drive has an industry standard form factor and the connector is configured in the disk drive such that the connector lies within the industry standard form factor.

7. A method for testing a disk drive including a serial ATA interface for coupling the disk drive to a host computer, a bridge circuit having a serial ATA port coupled to the serial ATA interface for receiving and transmitting serial ATA data signals, a parallel ATA port for receiving and transmitting parallel ATA signals, and a disable input for selectably disabling the parallel ATA port, the bridge circuit performing signal conversions between the ports, and a test interface for coupling the disk drive to a disk-drive test system, the test interface including a connector having contacts for parallel ATA signals coupled to the parallel ATA port of the bridge circuit, and having a contact for a disable signal coupled to the disable input of the bridge circuit, the method comprising:

applying a signal to the disable signal contact of the connector to disable the parallel ATA port of the bridge circuit; and applying parallel ATA signals to the contacts of the test interface for testing the disk drive.

* * * * *